United States Patent Office 2,717,226
Patented Sept. 6, 1955

2,717,226

PROCESS FOR THE MANUFACTURE OF A RAT EXTERMINATING COMPOUND CONTAINING DESICCATED, STORABLE SALMONELLA BACTERIA IN THEIR VIRULENT CONDITION

Aage Thorsen Skovsted, Valby, near Copenhagen, Denmark

No Drawing. Application April 3, 1951, Serial No. 219,132

Claims priority, application Denmark April 11, 1950

3 Claims. (Cl. 167—46)

The bacteria of the Salmonella group have for many years been used for the extermination of rats.

As, however, it is difficult to store these bacteria over a long period, it has hitherto been necessary to forward them in their nutritive substratum from the laboratory to the various places of storage. Since, however, this rat exterminator does not remain active for more than one or two months, showing a perceptibly weakened virulence already after seven to fourteen days, it is natural that scientists for a long time have directed their attention to the problem of bringing these bacteria, which do not reproduce by spores, into a virulent condition in which they may remain unweakened over a longer period. If so, it will be possible to forward them in this condition, and the nutritive substratum may then be added a short time before the rat exterminator is to be used. Hereby a substantial economy in the cost of carriage would also be obtainable, since the nutritive substratum is available at the individual places of storage.

In a known method of storing bacteria of this group the bacteria are cultivated on eggs and sterilized at a low temperature. This method may be carried through in laboratories, but has been found impracticable for vermin extermination in practice.

Furthermore, it is known that various bacteria, i. e. Salmonella typhimurium, may remain virulent when desiccated in small drops on paraffined filter paper stored at a pressure of 100 mm. of mercury above phosphorus pentoxide. The presence of the latter, however, involves insurmountable difficulties if the method is tried on vermin extermination in practice since phosphorus pentoxide cannot be removed from the bacteria culture in a way suitable for practice prior to its addition to the nutritive solution, and when added to this solution, phosphorus pentoxide develops so much heat as to involve, under unfavorable conditions, the risk of bursting the container with the said solution and of destroying the bacteria.

However, a suitable method has now been developed for the convenient production of a rat exterminating compound containing desiccated storable Salmonella bacteria in virulent condition in an ampulla under vacuum. By this method the bacteria may conveniently and without danger to the surroundings be transferred to their nutritive solution when the time for employing the rat exterminator approaches.

According to the invention the inner pressure of the ampulla containing the virulent bacteria is reduced to the order of ½ mm. of mercury and maintained at this pressure during storage. In fact, it has been found that the bacteria are capable of keeping virulent at this very low pressure, and the injurious steam pressure which has to be kept down in the known method in the case of phosphorus pentoxide is avoided in a simpler and more effective manner by the process now disclosed, which does not involve any complications by the use of the bacteria culture in practice.

The following procedure may be adopted for the production of the bacteria culture.

Bacteria of the Salmonella group, freshly isolated from animals, are placed in a strong concentrate in a nutritive solution consisting of pepton bouillon, to which is added 5 to 10 per cent gelatine. This mixture is filled into ampullae, each containing ½ to 1 ml., so that the entire surface of the inner walls of the ampulla is wetted.

The ampullae are dried under vacuum by means of a drying substance placed in drying bowls in the vacuum container in which the ampullae are placed. The inner pressure of the ampullae is rapidly reduced to the order of ½ mm. of mercury, for example, in the course of 7 days, the inner pressure being, according to the invention, suitably reduced by one half each day. On the first day the pressure provided should be about 100 mm. of mercury, the following three days the pressure should be reduced to 50, 25 and 10 mm. of mercury, respectively.

At the regular, preferably day-to-day inspection, the vacuum may, according to the invention, simply be broken when the drying bowl is replaced. The drying substance used may be phosphorus pentoxide. On the fifth day the pressure is reduced to 3 mm. and on the sixth day to 1 mm. of mercury, and on the seventh day the ampullae are individually subjected to a powerful pumping out and are sealed by melting under vacuum. The pressure of each ampulla may vary between 0.05 and 2 mm. of mercury, and in this condition the bacteria may be maintained virulent for years.

By the way, when the ampulla is broken a few days prior to the use of the exterminator and its contents are caused to dissolve in a nutritive substratum consisting of pepton bouillon, the bacteria have been found to disperse faster in this nutritive substratum if, according to the invention, a piece of filter paper has been inserted in the ampulla in advance. The said filter paper is inserted already at the sterilization of the ampulla prior to using it, and it is moistened by the nutritive gelatine when the latter is poured into the ampulla. The reason of the accelerated effect must be ascribed to the fact that the gelatine on the paper is more readily dissolved in the nutritive substratum than the film covering the inner walls of the glass.

What I claim and desire to secure by Letters Patent is:

1. A process for the manufacture of a rat exterminating compound containing desiccated, storable Salmonella bacteria in their virulent condition, which comprises placing unfrozen Salmonella bacteria in an ampule in a zone containing a chemical drying agent to provide a desiccating atmosphere, exhausting the atmosphere from said ampule to reduce the pressure inside said ampule to a final value of about ½ mm. of mercury, the reduction in pressure being effected in step-wise manner by reducing the pressure inside the ampule to about 100 mm. of mercury the first day and then reducing the pressure further for a series of successive days to desiccate said bacteria, said pressure being reduced on each of said successive days to a value of about ½ the value on the preceding day, and sealing said ampule under vacuum, whereby to maintain said reduced pressure in the ampule during storage.

2. A process for the manufacture of a rat exterminating compound containing desiccated, storable Salmonella bacteria in their virulent condition, which comprises placing a piece of filter paper in an ampule, placing unfrozen Salmonella bacteria in said ampule in a zone containing a chemical drying agent to provide a desiccating atmosphere, exhausting the atmosphere from said ampule to reduce the pressure inside said ampule to a final value of about ½ mm. of mercury and to desiccate said bacteria, the reduction in pressure being effected in step-wise manner by reducing the pressure inside the ampule to about 100 mm. of mercury the first day and then reducing the pressure further for a series of successive days, said pressure being reduced on each of said successive days to a value of about ½ the value on the preceding day, and sealing said ampule under vacuum, whereby to maintain said reduced pressure in the ampule during storage.

3. A process for the manufacture of a rat exterminating compound containing desiccated, storable Salmonella bacteria in their virulent condition, which comprises placing unfrozen Salmonella bacteria in a nutritive solution consisting of pepton bouillon and gelatine in an ampule in a zone containing a chemical drying agent to provide a desiccating atmosphere, exhausting the atmosphere from said ampule to reduce the pressure inside said ampule to a final value of about ½ mm. of mercury and to desiccate said bacteria, the reduction in pressure being effected in step-wise manner by reducing the pressure inside the ampule to about 100 mm. of mercury the first day and then reducing the pressure further for a series of successive days, said pressure being reduced on each of said successive days to a value of about ½ the value on the preceding day, and sealing said ampule under vacuum, whereby to maintain said reduced pressure in the ampule during storage.

References Cited in the file of this patent

UNITED STATES PATENTS

| | | |
|---|---|---|
| 1,413,006 | Crowther | Apr. 18, 1922 |
| 1,728,333 | Crowther | Sept. 17, 1929 |
| 2,619,448 | Larsen | Nov. 25, 1952 |

FOREIGN PATENTS

| | | |
|---|---|---|
| 95,581 | Sweden | May 2, 1939 |

OTHER REFERENCES

"Manufacturing Chemist," May 1951, vol. 22, No. 5, p. 185.

"Bacteriology and Allied Subjects" by Louis Gershenfeld, Mack Publishing Co., Easton, Pa. (1945) at p. 266.

"Gas Analysis and Testing of Gaseous Materials" by V. J. Altieri. Am. Gas Assn., Inc.

Shackell, Am. J. of Physiol., vol. 54, pp. 325 to 340, p. 325 relied upon (1909).